(12) United States Patent
Kamon (10) Patent No.: US 10,254,767 B1
(45) Date of Patent: Apr. 9, 2019

(54) DETERMINING POSITION OR ORIENTATION RELATIVE TO A MARKER

(71) Applicant: Amazon Technologies, Inc., Seattle, WA (US)

(72) Inventor: Ishay Kamon, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 194 days.

(21) Appl. No.: 15/415,180

(22) Filed: Jan. 25, 2017

(51) Int. Cl.
*G05D 1/00* (2006.01)
*G05D 1/06* (2006.01)
*B64C 39/02* (2006.01)
*B64D 43/00* (2006.01)

(52) U.S. Cl.
CPC ......... *G05D 1/0676* (2013.01); *B64C 39/024* (2013.01); *B64D 43/00* (2013.01); *B64C 2201/141* (2013.01); *B64C 2201/18* (2013.01)

(58) Field of Classification Search
None
See application file for complete search history.

(56) References Cited

U.S. PATENT DOCUMENTS

| | | | | |
|---|---|---|---|---|
| 9,592,912 B1 * | 3/2017 | Michini | ................ | G01C 15/02 |
| 9,944,405 B2 * | 4/2018 | Mouton | ................ | B64C 27/006 |
| 2005/0125142 A1 * | 6/2005 | Yamane | ................ | G01C 11/00 |
| | | | | 701/510 |
| 2009/0138138 A1 * | 5/2009 | Ferren | ................ | G05D 1/0676 |
| | | | | 701/3 |
| 2015/0032295 A1 * | 1/2015 | Stark | ................ | G05D 1/101 |
| | | | | 701/3 |
| 2015/0261217 A1 * | 9/2015 | Gil | ................ | G05D 1/0038 |
| | | | | 701/2 |
| 2016/0068264 A1 * | 3/2016 | Ganesh | ................ | G08G 5/0069 |
| | | | | 701/2 |
| 2016/0122038 A1 * | 5/2016 | Fleischman | ................ | G06T 7/73 |
| | | | | 701/2 |

\* cited by examiner

*Primary Examiner* — Truc M Do
(74) *Attorney, Agent, or Firm* — Lee & Hayes, P.C.

(57) ABSTRACT

A system may include first and second sensors configured to be coupled to a vehicle and generate surface sensor signals representative of a surface on which a location marker is disposed, and generate marker sensor signals representative of the location marker. The system may also include a sensor processor configured to estimate at least one of a position or an orientation of the first sensor relative to the surface on which the location marker is disposed based at least in part on the surface sensor signals, and estimate at least one of a position or an orientation of the second sensor relative to the location marker based at least in part on the marker sensor signals. The sensor processor may be configured to calculate at least one of the position or the orientation of the vehicle relative to the location marker based at least in part on the estimations.

20 Claims, 6 Drawing Sheets

DETERMINING POSITION OR ORIENTATION RELATIVE TO A MARKER

BACKGROUND

Systems may be used to determine the position and/or orientation of a sensor relative to an object. For example, some systems may use the sensor to determine the distance between the sensor and the object and/or the orientation of the sensor relative to the object. However, if the object is relatively small or the distance between the sensor and the object is substantial, it may be difficult to accurately determine the position and/or orientation of the sensor relative to the object. As a result, the determined position and/or orientation may not be as accurate as desired for certain applications.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

This disclosure is generally directed to determining the position and/or orientation of a sensor relative to a marker. This concept may be applied to any sensor system including one or more sensors, where it is desirable to determine the position and/or orientation of the one or more sensors (or an object coupled thereto) relative to the marker. A marker may be any two-dimensional or three-dimensional object that may be used to designate, for example, a location and/or other information. For example, a marker may be any two- or three-dimensional object used to designate a location and/or other information for use in at least temporary guidance of a vehicle such as an unmanned aerial vehicle (UAV).

As discussed above, in certain situations, it may be difficult to determine, with a desired level of accuracy, the position and/or orientation of a sensor relative to a marker. In many applications, the one or more sensors may be coupled to a machine or device, and the position and/or orientation of the machine or device relative to the marker may be determined based at least in part on the position and/or orientation of the one or more sensors relative to the marker. However, if the position and/or orientation of the one or more sensors is not known with the desired level of accuracy, operation of the machine or device may be compromised. This disclosure is generally directed to determining the position and/or orientation of one or more sensors relative to a marker in a manner that may result in the desired level of accuracy.

For example, an autonomous vehicle, such as a UAV, may include a system having one or more sensors to assist with flight control and navigation. The sensors of the system may be coupled to a frame of the vehicle and may generate sensor signals representative of the environment through which the vehicle travels. The control system of the vehicle may use the generated sensor signals to determine information about one or more of the position, orientation, and velocity of the vehicle, as well as the position and/or movement of objects in the environment surrounding the vehicle. For example, the one or more sensors may be used to detect a marker associated with a desired destination of the UAV, and the control system may be configured to control operation of the UAV so that it travels to, or lands, in the vicinity of, or on, the marker. However, until the UAV is within a certain range of the marker, depending in part on the size of the marker and/or the attitude of the sensors relative to the marker, it may be difficult to determine the position and/or orientation of the UAV relative to the marker. This may impart inaccuracies in the information used to control the UAV and land in the vicinity of, or on, the marker. One or more examples described in this disclosure may mitigate or eliminate such inaccuracies.

This disclosure is also generally directed to a system for estimating at least one of a position or an orientation of a vehicle relative to a location marker. The location marker may be associated with an intermediate destination (e.g., a waypoint, etc.), a delivery destination, a final destination, etc. In some examples, the vehicle may be a UAV. The system may include a first sensor configured to be coupled to the vehicle and generate surface sensor signals representative of a surface on which the location marker is disposed. The system may also include a second sensor configured to be coupled to the vehicle and generate marker sensor signals representative of the location marker. The system may further include a sensor processor in communication with the first and second sensors and configured to estimate at least one of a position or an orientation of the first sensor relative to the surface on which the location marker is disposed based at least in part on the surface sensor signals received from the first sensor. The sensor processor may also be configured to estimate at least one of a position or an orientation of the second sensor relative to the location marker based at least in part on the marker sensor signals received from the second sensor. The sensor processor may be further configured to calculate at least one of the position or the orientation of the vehicle relative to the location marker based at least in part on (i) the estimation of at least one of the position or the orientation of the first sensor relative to the surface and (ii) the estimation of at least one of the position or the orientation of the second sensor relative to the location marker. In some examples, this may improve the accuracy of the determination of the position and/or orientation of the vehicle relative to the location marker, as compared to, for example, systems that do not determine or factor-in the position and/or orientation of a sensor relative to a surface on which the location marker is disposed. The surface may present a larger area relative to the area of the location marker, and the determination of the position and/or orientation relative to the surface may be more accurately determined from higher altitudes, greater distances, and/or more shallow sensor attitudes, as compared to, for example, systems that do not determine or factor-in the position and/or orientation of sensors relative to the surface on which the location marker is disposed.

The position of the sensors and/or the position of a vehicle to which the sensors may be coupled may be represented by the north east down (NED) position of the sensors and vehicle, where the NED position is represented by three coordinate values corresponding respectively to the sensor position or vehicle position along the northern axis, the sensor position or vehicle position along the eastern axis, and the sensor position or vehicle position along the vertical axis. As used herein, the position may refer to one or more of the three axis positions. However, other coordinate systems may be used to represent position or other information about a sensor or vehicle. The orientation of the sensors and/or the orientation of a vehicle to which the sensors may be coupled may be represented by angles of rotation relative to one or more of the three axes, for example, as degrees of roll, pitch, and/or yaw.

In some examples, the system may be implemented on a UAV. In such examples, the system may further include one or more processors and memory to store a vehicle controller executable by the one or more processors to control operation of the UAV based at least in part on at least one of the position or the orientation of the vehicle relative to the marker.

In some examples, the first sensor may include a first imager, the second sensor may include a second imager, and the sensor processor may include an image processor configured to calculate at least one of the position or the orientation of the vehicle relative to the location marker based at least in part on the surface sensor signals representative of the surface on which the location marker is disposed. In some examples, the first and second imagers may form at least a portion of a stereo camera system configured to generate signals representative of three-dimensional space. For example, the three-dimensional space may include the surface on which the marker is disposed, and the sensor processor may be configured to generate a virtual representation of at least a portion of the environment surrounding the vehicle, such as for example, a virtual representation of the surface on which the location marker is disposed.

In some examples, the sensor processor may be configured to identify at least one of an edge or a corner of the location marker based at least in part on the marker sensor signals received from the second sensor. In some examples, the location marker may be substantially planar. In some examples, the location marker may be three-dimensional. In some examples, the marker may be circular, and the circumferential edge of the marker may define the edge of the location marker. In some examples, the location marker may be polygonal, such as, for example, square or rectangular, and the edges and/or corners of the polygon may define the edges and/or corners of the marker. Other location marker shapes are contemplated.

In some examples, the sensor processor may be configured to associate at least one of the edge or the corner of the location marker with the estimate of at least one of the position or the orientation of the first sensor relative to the surface on which the location marker is disposed. For example, the sensor processor may be configured to generate a virtual surface plane based at least in part on the surface sensor signals received from the first sensor, and generate a virtual marker based at least in part on the marker sensor signals received from the second sensor. In some examples, the virtual marker may include at least one of the edge or the corner. In some examples, the sensor processor may be configured to project the virtual marker onto the virtual surface plane such that at least one of the edge or the corner of the virtual marker lies in the virtual surface plane. The sensor processor may be configured to calculate at least one of the position or the orientation of the vehicle relative to the location marker based at least in part on the projection of the virtual marker onto the virtual surface plane. In some examples, the surface may be a ground plane associated with (e.g., surrounding) the marker, and the virtual surface plane may be a representation of the ground plane.

This disclosure is also generally directed to a method for estimating at least one of a position or an orientation of a sensor relative to a marker associated with a surface on which the marker is disposed. The method may include receiving surface sensor signals representative of the surface on which the marker is disposed from a sensor, and estimating at least one of a position or an orientation of the sensor relative to the surface on which the marker is disposed based at least in part on surface sensor signals. The method may also include receiving marker sensor signals representative of the marker, and calculating at least one of the position or the orientation of the sensor relative to the marker based at least in part on the estimation of at least one of the position or the orientation of the sensor relative to the surface and the marker sensor signals. In some examples, this method may improve the accuracy of the determination of the position and/or orientation of the sensor relative to the marker, as compared to, for example, methods that do not factor-in the position and/or orientation of the sensor relative to the surface.

In some examples of the method, the sensor may be either a first sensor or a second sensor, and receiving the surface sensor signals representative of the surface may include receiving the surface sensor signals from the first sensor, and receiving the marker sensor signals representative of the marker may include receiving the marker signals from the second sensor. In some examples, calculating at least one of the position or the orientation of the sensor may include calculating at least one of the position or the orientation of at least one of the first sensor or the second sensor relative to the marker. In some examples, the surface sensor signals and the marker sensor signals may include sensor signals representative of respective images of the surface and the marker, and calculating at least one of the position or the orientation of the sensor relative to the marker may be based at least in part on the sensor signals representative of the images of the surface and the marker.

In some examples of the method, the method may further include identifying at least one of an edge or a corner of the marker based at least in part on the marker sensor signals. For example, the method may include associating at least one of the edge or the corner of the marker with the estimate of at least one of the position or the orientation relative to the surface on which the marker is disposed, and calculating at least one of the position or the orientation of at least one of the first sensor or the second sensor relative to the marker based at least in part on the association of at least one of the edge or the corner of the marker and the surface. In some examples of the method, the method may further include generating a virtual surface plane based at least in part on the surface sensor signals, generating a virtual marker based at least in part on the marker sensor signals, and projecting the virtual marker onto the virtual surface plane, such that at least one of the edge or the corner of the marker lies in the virtual surface plane. In some examples, the method may further include calculating at least one of the position or the orientation of at least one of the first sensor or the second sensor relative to the marker based at least in part on the projection of the virtual marker onto the virtual surface plane. In some examples, the method may also include estimating a virtual marker plane in which the virtual marker lies, and comparing the virtual surface plane with the virtual marker plane. According to some examples of the method, when the virtual surface plane and the virtual marker plane are coexistent, the method includes discontinuing using the estimation of at least one of the position or the orientation of the sensor relative to the surface to calculate at least one of the position or the orientation of the sensor relative to the marker.

This disclosure is also generally directed to a method for controlling a vehicle. The method may include estimating at least one of a position or an orientation of a sensor relative to a marker associated with a surface on which the marker is disposed, wherein the sensor is coupled to the vehicle. The method may further include calculating at least one of a position or an orientation of the vehicle relative to the marker based at least in part on the estimation of at least one of the position or the orientation of the sensor relative to the marker, and controlling the vehicle based at least in part on the calculation. In some examples, the method for controlling the vehicle may include navigating and maneuvering the vehicle to the marker and/or landing the vehicle in the vicinity of, or on, the marker.

This disclosure is also generally directed to a vehicle. The vehicle may include a frame, a propulsion system coupled to the frame to cause movement of the vehicle, and at least one sensor coupled to the frame and configured to generate (i) surface sensor signals representative of a surface on which a marker is disposed, wherein the marker is associated with a destination of the vehicle, and (ii) marker sensor signals representative of the marker. The vehicle may also include a sensor processor in communication with the at least one sensor. The sensor processor may be configured to estimate at least one of a position or an orientation of the at least one sensor relative to the surface on which the marker is disposed based at least in part on the surface sensor signals. The sensor processor may also be configured to estimate at least one of a position or an orientation of the at least one sensor relative to the marker based at least in part on the marker sensor signals. The sensor processor may be further configured to calculate at least one of the position or the orientation of the vehicle relative to the marker based at least in part on the estimation of at least one of the position or the orientation of the at least one sensor relative to the surface, and the estimation of at least one of the position or the orientation of the at least one sensor relative to the marker.

The techniques and systems described herein may be implemented in a number of ways. Example implementations are provided below with reference to the following figures.

Figure 1:
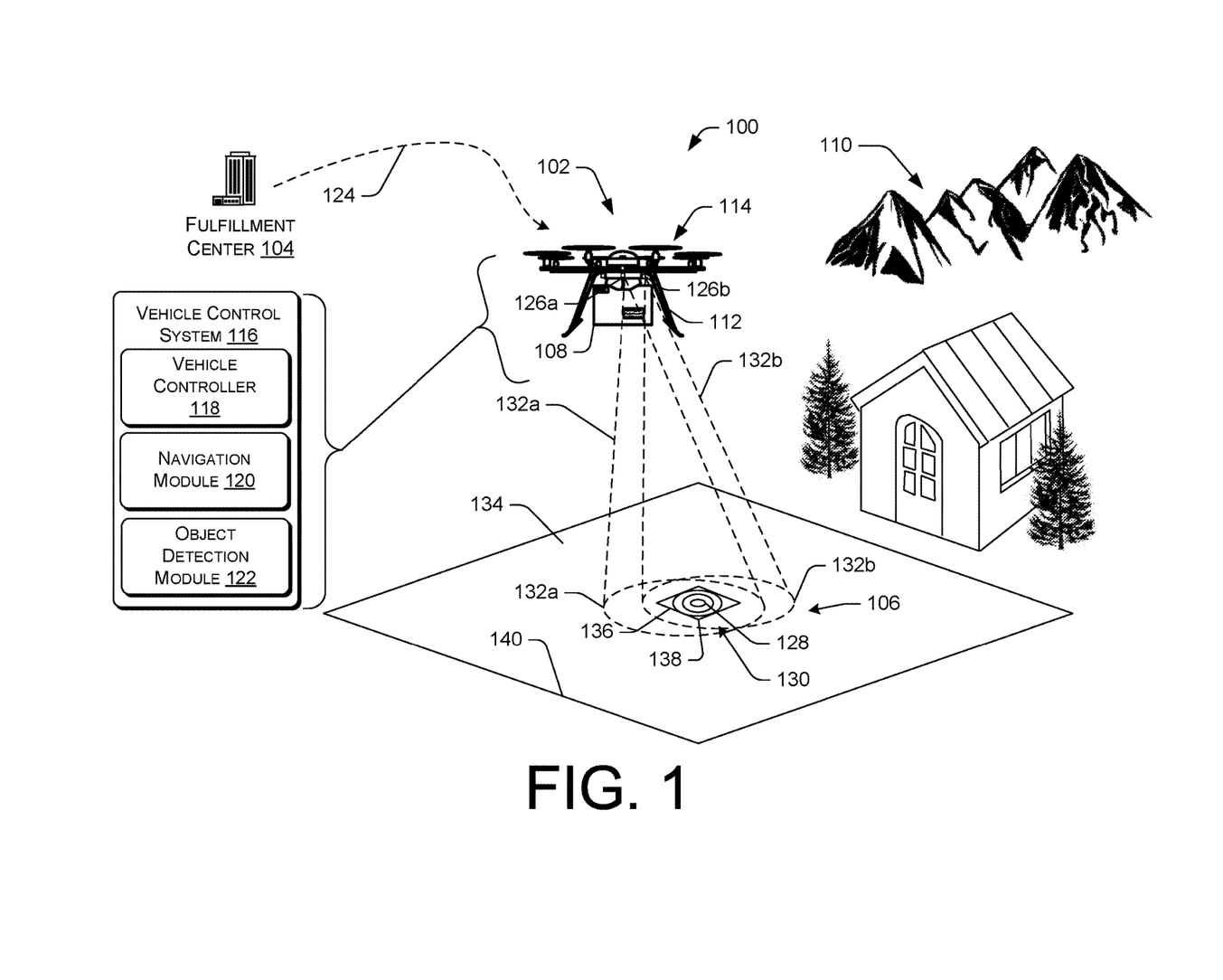
FIG. 1 is a schematic diagram of an illustrative environment that includes an illustrative unmanned aerial vehicle (UAV).

FIG. 1 is a schematic diagram of an illustrative environment 100 that includes a UAV 102 configured to travel through the environment 100 surrounding the UAV 102. The example environment 100 includes a fulfillment center 104 where the UAV 102 may originate a flight directed to a destination 106, such as a location associated with a recipient of a package 108 transported by the UAV 102. The example environment 100 shown in FIG. 1 includes terrain 110, which may include various features, such as mountains, trees, buildings, bridges, telephone poles and wires, other flying objects, and electrical power towers and power wires.

The UAV 102 may be equipped with a number of components to enable the UAV 102 to perform operations during the delivery of the package 108. For example, the UAV 102 may include a frame 112 and a propulsion system 114 coupled to the frame 112 and configured to propel the UAV 102 through the environment 100. The components may also include a vehicle control system 116 configured to control the flight of the UAV 102 and navigate the UAV 102 to and from its destination 106. In some examples, the vehicle control system 116 may include a vehicle controller 118 (e.g., a flight controller), a navigation module 120, and an object detection module 122, as well as other components discussed below with reference to FIGS. 1-4. For example, the UAV 102 may travel under control of the vehicle controller 118 and along a flight path 124 toward the destination 106. The vehicle controller 118 may receive data from the navigation module 120 to assist the vehicle controller 118 with following the flight path 124 to arrive at the destination 106. The vehicle controller 118 may continually, or from time to time, provide control signals to the propulsion system 114 and flight control surfaces of the UAV 102 to cause changes in its velocity, heading, altitude, orientation, and/or other changes (e.g., pitch, roll, yaw, hover, etc.), for example, based at least in part on data from the navigation module 120. In addition, the UAV 102 may execute different controlled maneuvers based on different flight scenarios, such as a takeoff stage, a transport stage, a package deposit stage, and/or a landing stage of flight.

The object detection module 122 may receive sensor signals from one or more sensors 126 coupled to the frame 112 of the UAV 102. The sensor signals may be indicative of objects in the surrounding environment 100. In some examples, the object detection module 122 may identify the objects and inform the vehicle controller 118 of detection of the object. For example, the object detection module 122 may identify objective markers 128 (e.g., location markers) via analysis of imagery captured by the sensors 126. The objective markers 128 may be associated with an intermediate destination or a final destination 106. For example, the objective markers 128 may be associated with a waypoint, a drop zone 130 for the destination 106, and/or may be associated with other locations.

The sensors 126 may include one or more sensors configured to generate sensor signals representative of the environment 100 surrounding the UAV 102 and through which the UAV 102 passes. In some examples, the sensors 126 may be configured to detect objects or obstacles to avoid, detect objective markers 128, assist with navigation, and/or assist with the performance of other functions. The UAV 102 may, at times, perform partially or fully autonomous flight using information captured by the sensors 126.

Figure 4:
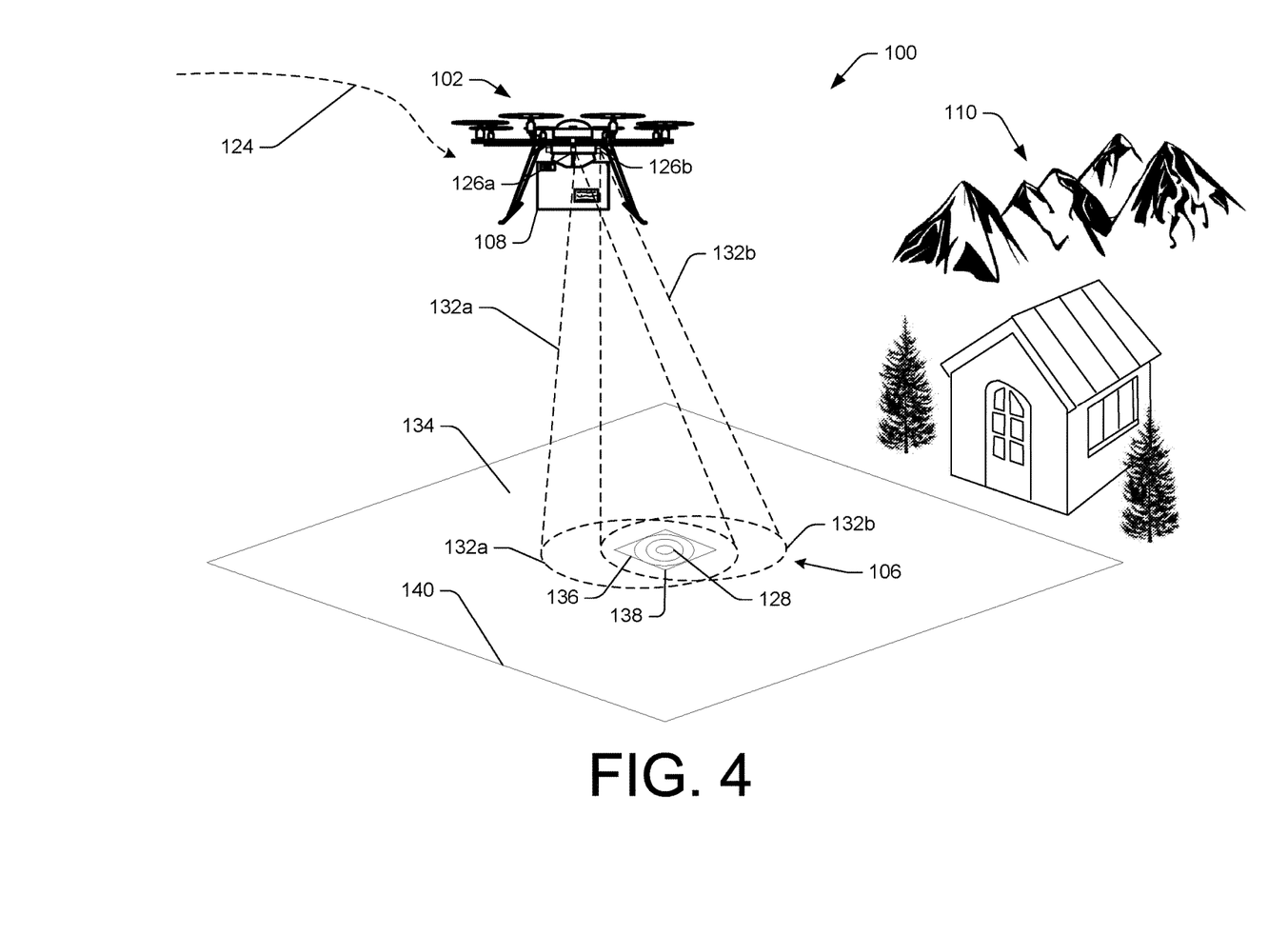
FIG. 4 is a schematic diagram of an illustrative environment that includes an illustrative UAV configured to determine its position and/or orientation relative to an example marker.

In some examples, the sensors 126 may provide a field of view 132, for example, as schematically shown in FIGS. 1 and 4, which may be used for vehicle control and/or navigation. For example, the sensors 126 may include a first sensor 126a coupled to the UAV 102 and configured to generate surface sensor signals representative of a surface 134 on which the marker 128 is disposed, and/or generate marker sensor signals representative of the marker 128. The example shown also includes a second sensor 126b coupled to the UAV 102 and configured to generate surface sensor signals representative of a surface 134 on which the marker 128 is disposed, and/or marker sensor signals representative of the marker 128.

As shown in FIG. 1, the example first and second sensors 126a and 126b have respective fields of view 132a and 132b that are directed toward the surface 134 and the marker 128 as the UAV 102 approaches the destination 106. In the example shown, the marker 128 is polygonal and defined by edges 136 and corners 138. Other configurations of the marker 128 are contemplated. The example surface 134 shown in FIG. 1 is polygonal and is defined by a perimeter 140. Other configurations of the surface 134 are contemplated.

In some examples, the sensors 126 may include one or more optical sensors, such as, for example, single lens cameras, stereo cameras, multi-lens cameras, digital still cameras, red green blue (RGB) cameras, video cameras, thermographic cameras, infrared sensors or cameras, light detection and ranging (LIDAR) systems, and/or any other sensors capable of converting light or electromagnetic radiation into electrical signals that are indicative of an object or objects in the field of view 132 of the optical sensor. Other types of sensors are contemplated, such as, for example, radio detection and ranging (RADAR) sensors, sound navigation and ranging (SONAR) sensors, or any other type of sensor capable of detecting and/or generating signals representative of an object in a field of view of the sensor 126. In some examples, an optical sensor may include a stereo camera having two or more imagers configured to be used together to capture or obtain images of three-dimensional space. For example, a stereo camera may be a digital camera and may include a lens. In some examples, the stereo camera may include a separate image sensor, detector, or film frame for each lens. In some examples, a single sensor may be used in combination with multiple lenses of the stereo camera.

Figure 2:
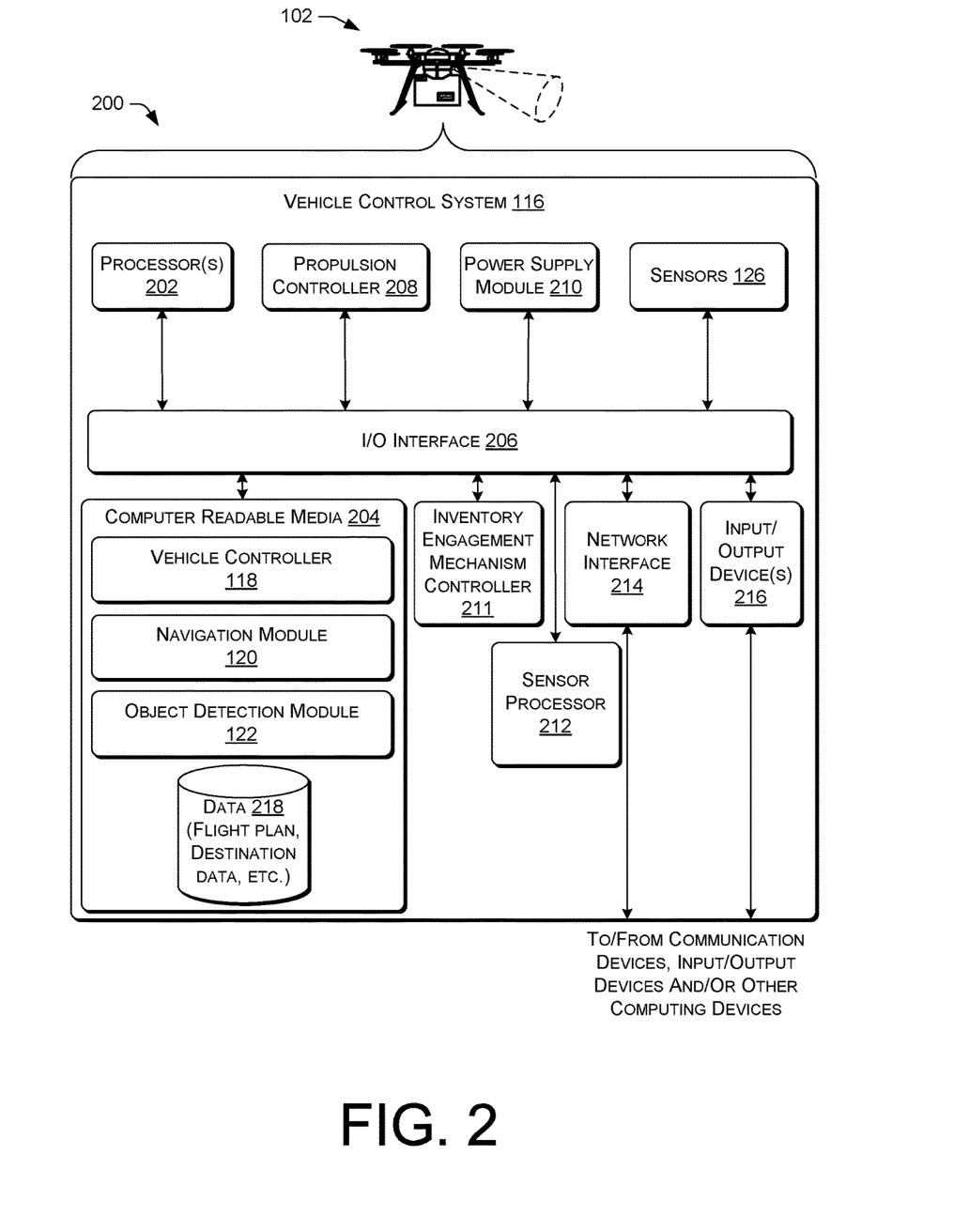
FIG. 2 is a block diagram of an illustrative UAV architecture of the UAV shown in FIG. 1.

FIG. 2 is a block diagram of an illustrative UAV architecture 200 of the UAV 102. The UAV architecture 200 may be used to implement the various systems, devices, and techniques discussed herein. In the example implementation, the UAV architecture 200 includes one or more processors 202, coupled to a non-transitory computer readable media 204 via an input/output (I/O) interface 206. The UAV architecture 200 may also include a propulsion controller 208 configured to control operation and output the propulsion system 114 (FIG. 1), and a power supply module 210 configured to control operation of a power supply (not shown) configured to supply power to the UAV 102 for operation of its systems.

The example architecture 200 shown in FIG. 2 also includes the vehicle controller 118, the navigation module 120, and the object detection module 122, which may be part of the computer readable media 204. The UAV architecture 200 may further include an inventory engagement mechanism controller 211 configured to interact with the package 108 and thereby secure and/or release the package 108 based on package control logic.

The sensors 126 are also part of the example architecture 200 and are in communication with a sensor processor 212, which may be configured to process sensor signals received from the sensors 126, for example, for use by the vehicle controller 118, the navigation module 120, and/or the object detection module 122, to assist with controlling the navigation and flight of the UAV 102. For example, the sensor signals may be used by the sensor processor 212 to generate a digital scene representative of the environment 100 surrounding the UAV 102, for example, in three dimensions. In some examples, the architecture 200 also includes a network interface 214 configured to facilitate data communications between the UAV 102 and other devices attached to a network, such as, for example, other computer systems and/or other vehicle control systems of other UAVs. For example, the network interface 214 may enable wireless communication between numerous UAVs. In various implementations, the network interface 214 may support communication via wireless general data networks, such as a Wi-Fi network. In some examples, the network interface 214 may support communication via telecommunications networks such as cellular communication networks, satellite networks, and the like.

The example architecture 200 shown in FIG. 2 also includes one or more input/output devices 216, such as, for example, one or more displays, imaging devices, thermal sensors, infrared sensors, time of flight sensors, accelerometers, gyroscopes, pressure sensors, weather sensors, optical sensors, gimbals, landing gear, and/or other devices that may be used to assist operation of the UAV 102, and/or other input/output devices commonly used in aviation. Multiple input/output devices 216 may be present and controlled by the UAV architecture 200.

In various implementations, the UAV architecture 200 may be implemented using a uniprocessor system including one processor 202, or a multiprocessor system including several processors 202 (e.g., two, four, eight, or another suitable number). The processor(s) 202 may be any suitable processor capable of executing instructions. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 204 may be configured to store executable instructions/modules, data, flight paths, and/or data items accessible by the processor(s) 202, such as, for example, data 218. In various implementations, the non-transitory computer readable media 204 may be implemented using any suitable memory technology, such as static random access memory (SRAM), synchronous dynamic RAM (SDRAM), nonvolatile/flash-type memory, or any other type of memory. In the illustrated implementation, program instructions and data implementing desired functions, such as those described above, are shown stored within the non-transitory computer readable memory. In other implementations, program instructions, data and/or flight paths may be received, sent, or stored upon different types of computer-accessible media, such as non-transitory media, or on similar media separate from the non-transitory computer readable media 204 or the UAV architecture 200. Generally speaking, a non-transitory, computer readable memory may include storage media or memory media such as flash memory (e.g., solid state memory), magnetic or optical media (e.g., disk) coupled to the UAV architecture 200 via the I/O interface 206. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 214.

In one implementation, the I/O interface 206 may be configured to coordinate I/O traffic between the processor(s) 202, the non-transitory computer readable media 204, and any peripheral devices, the network interface 214 or other peripheral interfaces, such as input/output devices 216. In some implementations, the I/O interface 206 may perform any necessary protocol, timing, or other data transformations to convert data signals from one component (e.g., non-transitory computer readable media 204) into a format suitable for use by another component (e.g., processor(s) 202). In some implementations, the I/O interface 206 may include support for devices attached through various types of peripheral buses, such as, for example, a variant of the Peripheral Component Interconnect (PCI) bus standard or the Universal Serial Bus (USB) standard. In some implementations, the function of the I/O interface 206 may be split into two or more separate components, such as, for example, a north bridge and a south bridge. Also, in some implementations, some or all of the functionality of the I/O interface 206, such as an interface to the non-transitory computer readable media 204 may be incorporated directly into the processor(s) 202.

In some examples, the propulsion controller 208 communicates with the navigation module 120 and adjusts the power of each propulsion member (e.g., each propeller motor or each thruster) of the propulsion system 114 to guide the UAV 102 along the determined flight path 124. The power supply module 210 may control the charging and any switching functions associated with one or more power modules (e.g., batteries) of the UAV 102.

As explained herein, the navigation module 120 may include systems to facilitate navigating the UAV 102 to and/or from a location, such as from the fulfillment center 104 to the destination 106. The inventory engagement mechanism controller 211 communicates with actuator(s) or motor(s) (e.g., a servo motor) used to engage and/or disengage inventory, such as the package 108. For example, when the UAV 102 is positioned over a surface at a delivery location (e.g., a relatively level surface), the inventory engagement mechanism controller 211 may provide an instruction to a motor that controls the inventory engagement mechanism to release the package 108.

In some embodiments, the computer readable media 204 may store the vehicle controller 118, the navigation module 120, and the object detection module 122. The components may access and/or write data 218, which may include flight plan data, log data, destination data, image data, and object data, and so forth. The operations of the vehicle controller 118, the navigation module 120, and the object detection module 122 are described herein by way of various illustrative processes.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV architecture 200 may be transmitted to the UAV architecture 200 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations. Additional information about the operations of the modules of the UAV 102 is discussed below.

Figure 3:
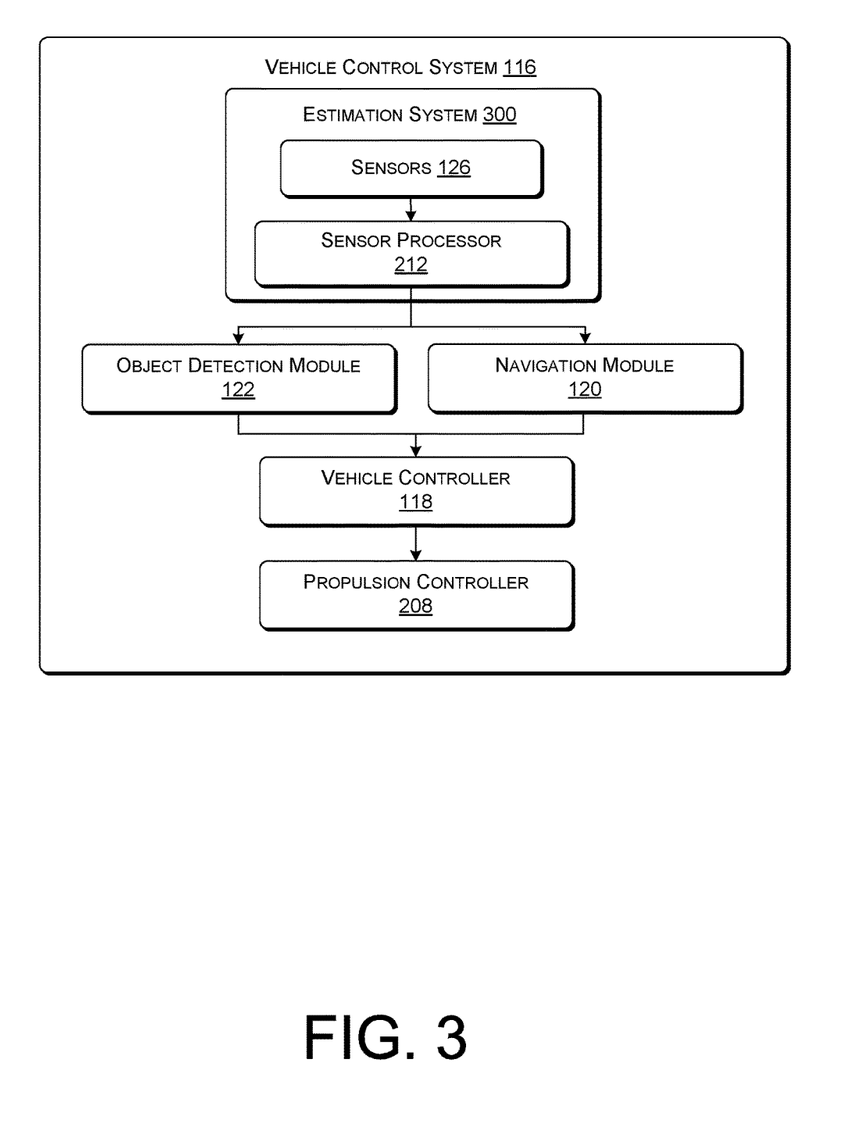
FIG. 3 is a block diagram of an illustrative vehicle control system configured to control operation of a vehicle.

FIG. 3 is a block diagram of an example of the vehicle control system 116. In some examples, the vehicle control system 116 may include one or more sensors 126, for example, such as the sensors described herein. The sensors 126 may be coupled to the frame 112 of the UAV 102, either directly or indirectly. In the example shown in FIG. 3, the sensor signals from the sensors 126 are received by the sensor processor 212, where the sensor signals are processed to transform them into a form for use by one or more of the object detection module 122, the navigation module 120, and/or the vehicle controller 118. In some examples, the sensor processor 212 may be configured to synchronize the sensor signals received from the sensors 126, for example, so that the respective sensor signals may be correlated with one another. In some examples, the sensor processor 212 may be an image processor and may be configured to generate a digital scene (e.g., a three-dimensional digital scene) of the environment 100 surrounding the UAV 102 and through which the UAV 102 travels. In some examples, the sensor processor 212 may use known image processing techniques to generate the digital scene.

As shown in the example of FIG. 3, sensor signals representative of the surrounding environment may be supplied to the object detection module 122 and/or the navigation module 120. For example, the object detection module 122 may use the signals to identify objects in the environment 100 surrounding the UAV 102. Such objects may include terrain 110, such, as for example, mountains, trees, buildings, bridges, telephone poles and wires, other flying objects, and electrical power towers and power wires. In some examples, the objects may include markers, such as the example markers 128 shown in FIGS. 1 and 4, which may be used to assist with navigation of the UAV 102. For example, a marker 128 may be used to identify the destination for delivery of the package 108. In some examples, the object detection module 122 may be configured to estimate the position, orientation, and/or velocity of an object, and/or to predict the future position, orientation, and/or velocity of the identified object.

In the example shown in FIG. 3, the navigation module 120 is also configured to receive the sensor signals from the sensor processor 212. In some examples, the navigation module 120 may use information from the sensor signals to supplement or improve the accuracy of the navigation of the UAV 102. For example, data from the sensor signals may be used to confirm or improve the accuracy of the navigation information generated by the navigation module 120. In some examples, data related to the environment surrounding the UAV 102 (e.g., image data) may be used to confirm or correct any discrepancies in the navigation data received from other sources and used by the navigation module 120 to navigate the UAV 102 along its flight path 124 to its destination 106. For example, the navigation module 120 may include one or more global positioning satellite (GPS) receivers for receiving signals from global positioning satellites to determine the position of the UAV 102, and/or one or more gyroscopes and accelerometers to determine the position, orientation (e.g., pitch, roll, and yaw), and/or velocity of the UAV 102, for example, using inertial navigation techniques. In some examples, the navigation module 120 may be configured to also receive sensor signals from the sensor processor 212 (e.g., image data from an image processor) to confirm one or more of the position, orientation, and velocity of the UAV 102, for example, using image-based dead-reckoning or similar navigation techniques. The position of the UAV 102 may be represented by the north east down (NED) position of the UAV 102.

For example, the sensors 126 may include one or more imagers in communication with the sensor processor 212, which may be an image processor configured to analyze images received from the sensors 126. The image processor may be configured to analyze images received from the sensors 126 and estimate the motion of the UAV 102 relative to, for example, a prior-in-time position estimation. For example, at any given time, the sensors 126 may capture image data of the terrain 110 through which the UAV 102 travels, and the sensor processor 212 may be configured to estimate one or more of the distance, direction, and altitude through which the UAV 102 has moved relative to the position of the UAV 102 at a moment prior-in-time. The sensor processor 212 may use any image analysis techniques known to those skilled in the art, such as, for example, feature extraction techniques to identify lines, edges, ridges, textures, and shapes in the image data. In some examples, the images may be pre-processed to, for example, re-sample them, reduce noise in the data, and/or enhance the contrast in the images. In some examples, the sensor processor 212 may use one or more of the following techniques to analyze the images: point of interest selection, segmentation, image recognition, and image registration. In some examples, multi-view stereo techniques may be used to acquire and analyze the images.

In some examples, the navigation module 120 may be configured to receive the relative motion estimation obtained from the sensor processor 212 and combine it with the position estimation from, for example, a GPS receiver and/or an inertial navigation system. Although the example sensor processor 212 and navigation module 120 are each shown as separate components, the sensor processor 212 and navigation module 120 may be integral with one another or with other portions of the vehicle control system 116. The navigation module 120 may determine an updated position estimation, for example, by combining the data associated with the position estimation from a GPS receiver and/or an inertial navigation system, and the data associated with the relative motion estimation from the navigation module 120.

For example, the navigation module 120 may estimate the updated position estimation by starting from a first position estimation received from a GPS receiver and/or an inertial navigation system, and adding to the first position estimation one or more of the distance, direction, and altitude change from the relative motion estimation. In other words, the navigation module 120, from a known starting point, adds one or more of the distance of movement, the direction of movement, and the altitude change estimates to determine the position to which the UAV 102 has travelled. In this example manner, the accuracy and/or responsiveness of the navigation module 120 may be increased.

In some examples, the object detection module 122 and/or the navigation module 120 may estimate, based on at least in part on the sensor signals received from the sensor processor 212, at least one of the position of the UAV 102, the velocity of the UAV 102, the orientation of the UAV 102, the positions of objects in the surrounding environment 100, and/or movement of the objects in the surrounding environment 100. In some examples, this estimation may be performed in combination with, or by, other components of the vehicle control system 116.

As shown in FIG. 3, the example vehicle controller 118 may receive information in the form of sensor signal data from the object detection module 122 and/or the navigation module 120. For example, the vehicle controller 118 may receive data signals representative of the estimation of at least one of the position of the UAV 102, the orientation of the UAV 102, the velocity of the UAV 102, the positions of objects in the surrounding environment 100, and/or movement of the objects in the surrounding environment 100. The vehicle controller 118 may use some or all of the information in the sensor signal data to control flight of the UAV 102, for example, by sending signals in the form of control commands to the propulsion controller 208 and/or to flight control surfaces of the UAV 102. In this example manner, the vehicle control system 116 may control and navigate the UAV 102 along its flight path 124 to its destination 106. Along the way, the UAV 102 may avoid terrain features 110 and/or objects in the environment 100 surrounding the UAV 102 based on sensor signals generated by the sensors 126, and either return to its flight path 124, or modify its flight path 124, to account for avoiding the terrain features 110 and/or the objects.

In some examples, for example as shown in FIG. 3, the vehicle control system 116 includes an estimation system 300 for estimating the position and/or orientation of a vehicle, such as, for example, the UAV 102, relative to a marker 128 associated with a flight oath 124 or a destination 106 of the UAV 102. The estimation system 300 may include one or more of the sensors 126. For example, the estimation system 300 may include a first sensor 126 coupled to the UAV 102 and configured to generate surface sensor signals representative of a surface on which the marker 128 is disposed. In some examples, the estimation system 300 may also include a second sensor 126 coupled to the UAV 102 and configured to generate marker sensor signals representative of the marker 128. In the example shown in FIG. 3, the estimation system 300 also includes the sensor processor 212, which is in communication with the first and second sensors 126 and is configured to estimate a position and/or an orientation of the first sensor 126 relative to the surface on which the marker 128 is disposed based at least in part on the surface sensor signals received from the first sensor 126. The sensor processor 212 may also be configured to estimate a position and/or an orientation of the second sensor 126 relative to the marker 128 based at least in part on the marker sensor signals received from the second sensor 126. The sensor processor 212 may also be configured to calculate the position and/or the orientation of the UAV 102 relative to the marker 128 based at least in part on the estimation of the position and/or the orientation of the first sensor 126 relative to the surface and the estimation of the position and/or the orientation of the second sensor 126 relative to the marker 128.

FIG. 4 is a schematic diagram of an example environment 100 through which an example UAV 102 travels. As shown in FIG. 4, the UAV 102 is configured to travel through the environment 100 along a flight path 124 and maneuver to a destination 106 to deliver a package 108 in the vicinity of, or on, the marker 128. In the example shown, the estimation system 300 includes a first sensor 126a coupled to the UAV 102 and configured to generate surface sensor signals representative of a surface 134 on which the marker 128 is disposed. The example shown also includes a second sensor 126b coupled to the UAV 102 and configured to generate marker sensor signals representative of the marker 128. As shown in FIG. 4, the example first and second sensors 126a and 126b have respective fields of view 132a and 132b that are directed toward the surface 134 and the marker 128 as the UAV 102 approaches the destination 106. In some examples, the first and second sensors 126a and 126b may have respective fields of view 132a and 132b that at least partially overlap, for example, as shown in FIGS. 1 and 4. In some examples, the respective fields of view 132a and 132b may each at least partially cover the marker 128 simultaneously, for example, at some time during the approach of the UAV 102 toward the marker 128. In some examples, the sensor processor 212, which is in communication with the first and second sensors 126a and 126b, estimates the positions and/or the orientations of the first sensor 126a relative to the surface 134 on which the marker 128 is disposed based at least in part on the surface sensor signals received from the first sensor 126a. The sensor processor 212 also estimates the position and/or the orientation of the second sensor 126b relative to the marker 128 based at least in part on the marker sensor signals received from the second sensor 126b. In some examples, the sensor processor 212 may be configured to calculate the position and/or the orientation of the UAV 102 relative to the marker 128 based at least in part on the estimation of the position and/or the orientation of the first sensor 126a relative to the surface 134 and the estimation of the position and/or the orientation of the second sensor 126b relative to the marker 128. For example, the sensor processor 212 may be provided with the positions and/or orientations of the first and second sensors 126a and 126b relative to the UAV 102, and the sensor processor 212 may calculate the position and/or the orientation of the UAV 102 relative to the marker 128 based at least in part on the positions and/or orientations of the first and second sensors 126a and 126b relative to the UAV 102, and on the estimation of the position and/or the orientation of the first sensor 126a relative to the surface 134 and the estimation of the position and/or the orientation of the second sensor 126b relative to the marker 128. In some examples, the sensor processor 212 may receive the positions and/or orientations of the first and second sensors 126a and 126b relative to the UAV 102 during calibration of the estimation system 300.

In the example shown, the surface 134 includes a polygonal area of a surface surrounding the marker 128. In some examples, the surface 134 may be substantially circular. In some examples, the surface 134 may surround or substantially surround the marker 128. In some examples, the surface 134 may include an area surrounding the marker 128 and may be bounded by a perimeter 140 that is within a certain range of distances of the marker 128. For example, the range of distances may be based on at least one of the dimensions of the marker 128, such as the longest dimension or radius of the marker 128. For example, if the length of the marker 128 (or radius if the marker 128 is circular) is the longest dimension of the marker 128, then the perimeter 140 of the surface 134 may be located at a position, for example, from ten to twenty times the length of the marker 128 from the marker 128. Other ranges are contemplated. In some examples, the surface 134 may have a perimeter 140 that defines an area that is based on the area covered by the marker 128. For example, the area defined by the perimeter 140 of the surface 134 may be, for example, from ten to twenty times larger than the area of the marker 128. Other ranges are contemplated. In some examples, the surface 140 may be defined by other factors, such as, for example, the area of the surface surrounding the marker 128 that is substantially planar. In some examples, the surface 134 may be defined by the area that is detectable by the sensors 126 in a manner sufficient for useful guidance of the UAV 102 from a certain range and/or altitude. In some examples, the surface 134 may not surround the marker 128, but may instead be adjacent the marker 128. For example, the surface 134 may be defined by an area adjacent the marker 128 that is substantially planar.

Some examples of this configuration may result in improving the accuracy of the estimation of the position and/or orientation of the UAV 102 relative to the marker 128 as the UAV 102 approaches the destination 106. For example, as the UAV 102 travels along the flight path 124, it may be difficult for the sensors 126 to detect and accurately estimate the position and/or orientation of the UAV 102 relative to the marker 128 as it initially enters the vicinity of the area where the marker 128 is located. The sensors 126 and sensor processor 212 may initially detect the marker 128, but with insufficient clarity to accurately estimate the position and/or orientation of the UAV 102 relative to the marker 128. This may result from noise in the signals received from the sensors 126 due to the distance from the marker 128 and/or a relatively shallow attitude angle of the sensors 126 relative the marker 128 as the UAV 102 first enters the vicinity of the area where the marker 128 is located. Some examples of the estimation system 300 may be configured to estimate the position and/or orientation of the UAV 102 relative to the surface 134 on which the marker 128 is disposed, which, due to its larger area relative to the area of the marker 128, may be more accurately determined until the UAV 102 is closer to the marker 128. In some examples, the estimation system 300 may use the estimation of the position and/or orientation of the UAV 102 relative to the surface 134, for example, until the UAV 102 is close enough to the marker 128 for the sensors 126 and the sensor processor 212 to be able to the detect the marker 128 more clearly, for example, without noise that reduces the accuracy of the detection of the marker 128. In this example manner, the estimation system 300 may result in an improved estimation of the position and/or orientation of the UAV 102 relative to the marker 128, for example, from greater distances to the marker 128.

In some examples, the first sensor 126a may include a first imager, the second sensor 126b may include a second imager, and the sensor processor 212 may include an image processor configured to calculate the position and/or the orientation of the UAV 102 relative to the marker 128 based at least in part on the surface sensor signals representative of the surface 134 on which the marker 128 is disposed. In some examples, the first and second sensors 126a and 126b may form at least a portion of a stereo camera system configured to generate signals representative of three-dimensional space. For example, the three-dimensional space may include the surface 134 on which the marker 128 is disposed, and the sensor processor 212 may be configured to generate a virtual representation of at least a portion of the environment surrounding the UAV 102, such as, for example, a virtual representation of the surface 134 on which the marker 128 is disposed. In some examples, the first sensor 126a may be at least a portion of a stereo camera system, and the second sensor 126b may be at least a portion of a sensor system that is independent from the first sensor 126a. In some examples, one or more of the first and second sensors 126a and 126b may include other types of sensors, such as the sensor types described herein.

In some examples, the sensor processor 212 may be configured to identify an edge 136 and/or a corner 138 of the marker 128 based at least in part on the marker sensor signals received from the second sensor 126b. In some examples, the marker 128 may be substantially planar, for example, as shown in FIG. 4. In some examples, the marker 128 may be three-dimensional. In some examples, the marker 128 may be polygonal, such as, for example, square or rectangular as shown in FIG. 4, and the edges 136 and/or corners 138 of the polygon may define the edges and/or corners of the marker 128. In some examples, the marker 128 may be an Alvar marker. In some examples, the marker 128 may be circular, and the circumferential edge of the marker may define an edge of the marker. Other marker shapes are contemplated.

In some examples, the sensor processor 212 may be configured to associate one or more of the edges 136 and/or the corners 138 of the marker 128 with the estimate of the position and/or the orientation of the first sensor 126a relative to the surface 134 on which the marker 128 is disposed. For example, the sensor processor 212 may be configured to generate a virtual surface plane based at least in part on the surface sensor signals received from the first sensor 126a, and generate a virtual marker based at least in part on the marker sensor signals received from the second sensor 126b. In some examples, the virtual marker may include one or more of the edges 136 and/or the corners 138. In some examples, the sensor processor 212 may be configured to project the virtual marker onto the virtual surface plane, such that one or more of the edges 136 and/or the corners 138 of the virtual marker lie in the virtual surface plane. In some examples, the sensor processor 212 may be configured to calculate the position and/or the orientation of the UAV 102 relative to the marker 128 based at least in part on the projection of the virtual marker onto the virtual surface plane. In some examples, the surface 134 may be a ground plane associated with (e.g., surrounding) the marker 128, and the virtual surface plane may be a representation of the ground plane.

In this example manner, some examples of the estimation system 300 may be able to estimate the position and/or the orientation of the UAV 102 relative to the marker 128 from greater distances than if the estimation system 300 relied only on detection of the marker 128 as the UAV 102 approaches the destination 106. In some examples of the estimation system 300, as the UAV 102 approaches the marker 128, the estimation system 300 may be configured to reduce its reliance on the estimation of the position and/or orientation of the UAV 102 relative to the surface 134. For example, as the UAV 102 approaches the marker 128, one or more of the sensors 126 may begin to more accurately sense the marker 128, so that the position and/or the orientation of the UAV 102 relative to the marker 128 may become more accurate. In some examples, the estimation system 300 may be configured to compare the estimated position and/or orientation of the UAV 102 relative to the surface 134 with the estimated position and/or orientation relative to the marker 128. As these two estimates approach or overlap one another, the estimation system 300 may be configured to discontinue using the estimation of the position and/or the orientation of the first sensor 126a relative to the surface 134 and use only the estimation of the position and/or orientation of the second sensor 126b relative to the marker 128. For example, the estimation system 300 may be configured to estimate a marker plane in which the marker 128 lies based on the marker sensor signals received from the sensors and determine whether the marker plane in which the marker 128 lies is (or approaches being) coexistent with the virtual surface plane relating to the plane in which the surface 134 lies. In some examples, when the marker plane in which the marker 128 lies is (or approaches being) coexistent, the estimation system 300 may discontinue using the estimation of the position and/or orientation of the first sensor 126a relative to the surface 134 to calculate the position and/or orientation of the first sensor 126a relative to the marker 128. In some examples, the estimation system 300 may continue to use the estimation of the position and/or orientation of the first sensor 126a relative to the surface 134 to calculate the position and/or orientation of the UAV 102 relative to the marker 128.

Figure 5:
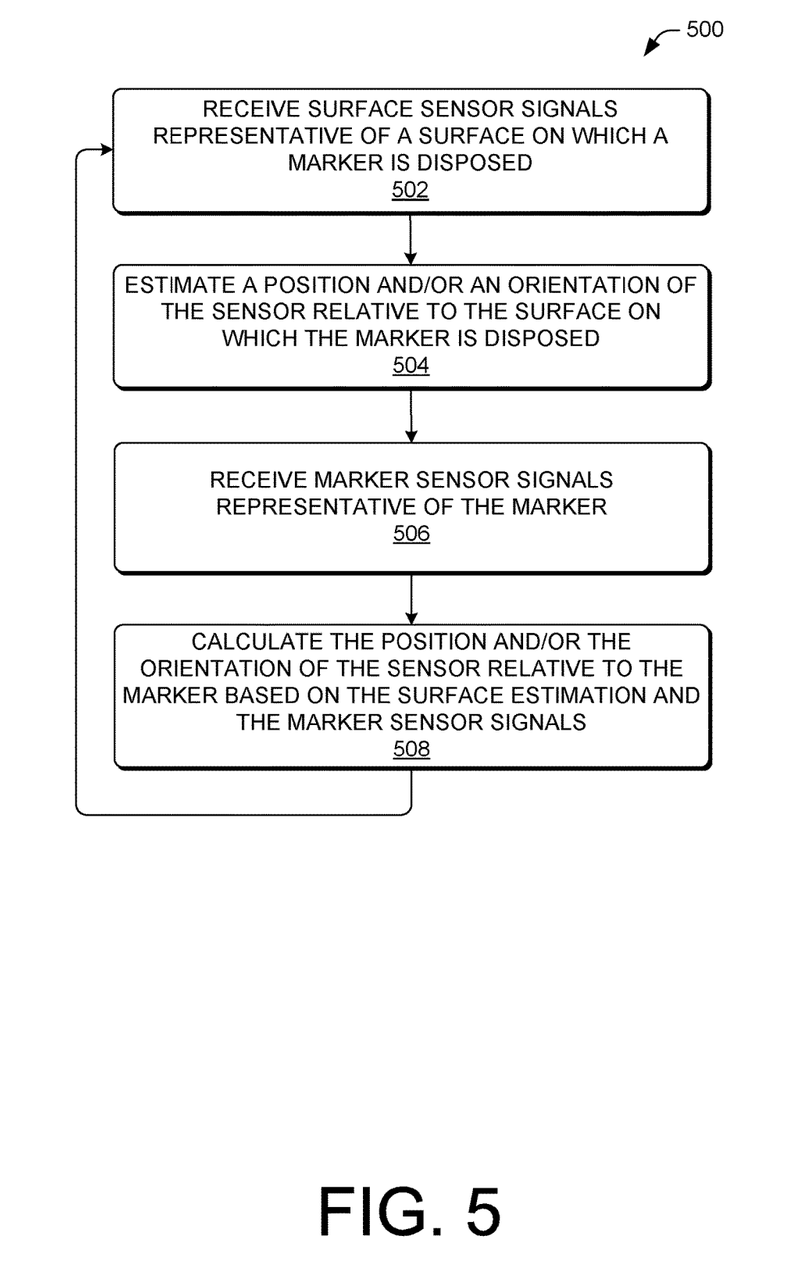
FIG. 5 is a flow diagram of an illustrative process for estimating a position and/or an orientation of a sensor relative to a marker.
Figure 6:
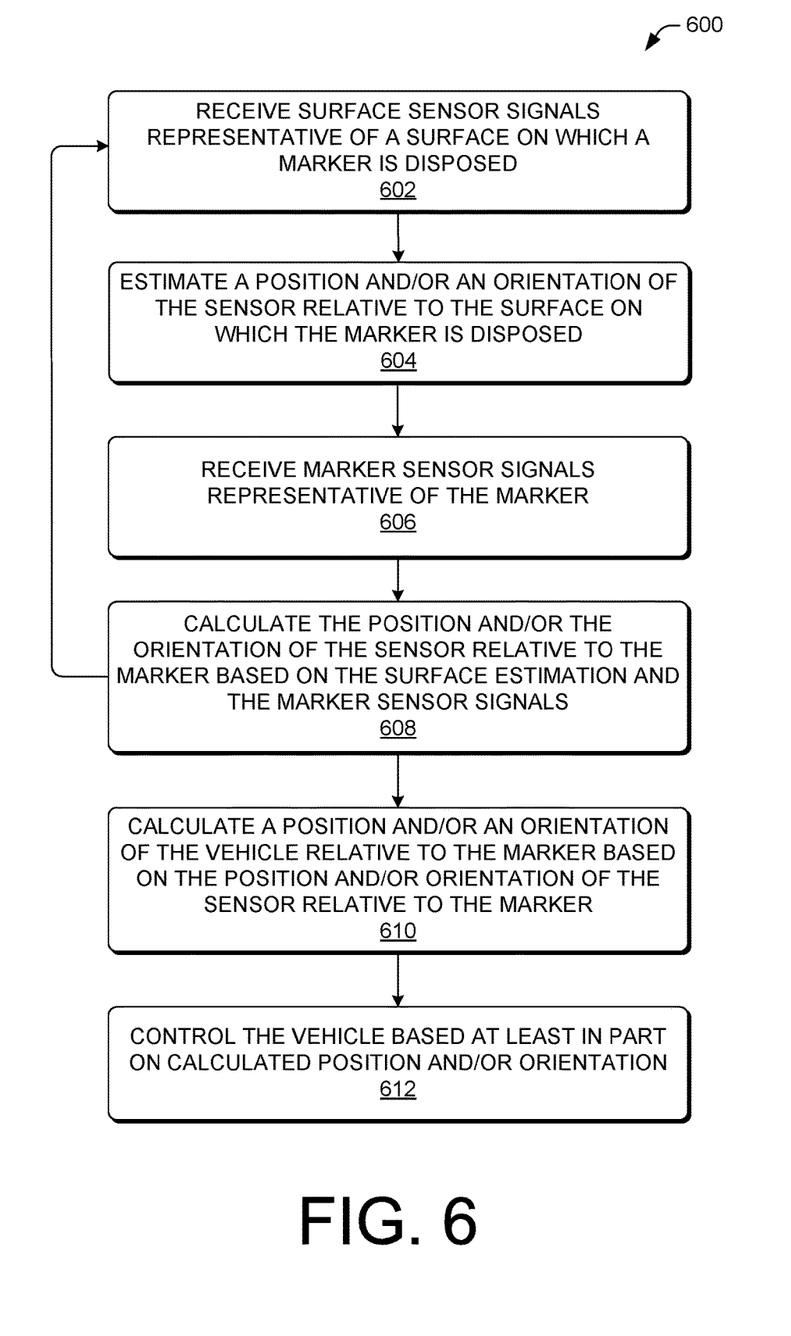
FIG. 6 is a flow diagram of an illustrative process for controlling a vehicle.

FIGS. 5 and 6 are flow diagrams of illustrative processes depicted as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 5 is a flow diagram of an illustrative process 500 for estimating a position and/or an orientation of a sensor relative to a marker associated with a surface on which the marker is disposed. This process may be applicable with any sensor system where calculating the position and/or the orientation of one or more sensors relative to a marker may be important.

In the example process 500 shown FIG. 5, at 502, the example process 500 may include receiving surface sensor signals representative of the surface on which the marker is disposed. In some examples, the surface may be directly under the marker, and the surface may have a larger area than the marker. In some examples, the surface may partially or fully surround the marker. In some examples, the surface may be adjacent the marker. In some examples, a sensor may be configured to generate surface sensor signals representative of the surface on which the marker is disposed. In some examples, the sensor may be a part of a stereo camera system configured to generate the surface sensor signals. Other types of sensors are contemplated, such as those mentioned herein.

At 504, the example process 500 may include estimating a position and/or an orientation of the sensor relative to the surface on which the marker is disposed based at least in part on surface sensor signals. In some examples, the surface sensor signals are received from a sensor by a sensor processor, which may be configured to estimate the position and/or orientation of the first sensor relative to the surface on which the marker is disposed. In some examples, the sensor processor may be an image processor configured to analyze and/or interpret the surface sensor signals.

At 506, the example process 500 may include receiving marker sensor signals representative of the marker. In some examples, the marker sensor signals may be received from a sensor. In some examples, the sensor that generates the marker sensor signals may include the sensor that generates surface sensor signals. In some examples, the sensor that generates the marker sensor signals may include a sensor that is different than the sensor that generates the surface sensor signals. For example, the sensor that generates the surface sensor signals may be part of a stereo camera system configured to generate a three-dimensional model of the environment surrounding the sensor including, for example, the surface. The sensor that generates the marker sensor signals may be part of the stereo camera system, or it may be a sensor that is separate from the stereo camera system.

At 508, the example process 500 may include calculating the position and/or the orientation of the sensor relative to the marker based at least in part on the estimation of the position and/or the orientation of the sensor relative to the surface and the marker sensor signals. In some examples, this may include calculating the position and/or the orientation of the sensor relative to the marker based at least in part on the surface sensor signals representative of the surface on which the marker is disposed. For example, the surface sensor signals and the marker sensor signals may include sensor signals representative of respective images of the surface and the marker, and the sensor processor may be configured to calculate the position and/or the orientation of the sensor relative to the marker based at least in part on the sensor signals representative of the images of the surface and the marker. In some examples, receiving the surface sensor signals representative of the surface may include receiving the surface sensor signals from a first sensor, and receiving the marker sensor signals representative of the marker may include receiving the marker signals from a second sensor. In such examples, calculating the position and/or the orientation of the sensor may include calculating the position and/or the orientation of the first sensor and/or the second sensor relative to the marker.

In some examples, at step 508 the process 500 may include identifying an edge and/or a corner of the marker based at least in part on the marker sensor signals. In such examples, step 508 may include associating the edge and/or the corner of the marker with the estimate of the position and/or the orientation relative to the surface on which the marker is disposed, and calculating the position and/or the orientation of the first sensor and/or the second sensor relative to the marker based at least in part on the association of the edge and/or the corner of the marker and the surface. For example, at step 508 the process 500 may include generating a virtual surface plane based at least in part on the surface sensor signals, and generating a virtual marker based at least in part on the marker sensor signals. Step 508 may further include projecting the virtual marker onto the virtual surface plane, such that the edge and/or the corner of the marker lies in the virtual surface plane, and calculating the position and/or the orientation of the first sensor and/or the second sensor relative to the marker based at least in part on the projection of the virtual marker onto the virtual surface plane.

In some examples, at least some portions of the process 500 may be repeated, for example, by returning to 502 after 508.

Some examples of the process 500 may be deployed as part of a process for controlling a vehicle, such as, for example, a UAV.

FIG. 6 is a flow diagram of an illustrative process 600 for controlling a vehicle. At 602, the example process 600 may include receiving surface sensor signals representative of the surface on which a marker is disposed. In some examples, the vehicle may be a UAV, and the marker may be associated with a destination to which the UAV is travelling, for example, a destination for delivering a package. In some examples, a sensor may be coupled to the vehicle and may be configured to generate surface sensor signals representative of the surface on which the marker is disposed. The sensor may be a part of a stereo camera system configured to generate the surface sensor signals. Other types of sensors are contemplated. In some examples, the surface sensor signals may be received by a sensor processor. For example, the sensor processor may be an image processor configured to analyze and/or interpret the surface sensor signals.

At 604, the example process 600 may include estimating a position and/or an orientation of the sensor relative to the surface on which the marker is disposed based at least in part on surface sensor signals. In some examples, the surface sensor signals are received by a sensor processor from a sensor coupled to the vehicle, which may be configured to estimate the position and/or orientation of the sensor relative to the surface on which the marker is disposed.

At 606, the example process may include receiving marker sensor signals representative of the marker. In some examples, the surface sensor signals may be received from a first sensor. In some examples, the marker sensor signals may be received from a second sensor coupled to the vehicle. In some examples, the process 600 may include estimating a position and/or an orientation of the sensor relative to the marker based at least in part on surface sensor signals received from the first sensor and the marker sensor signals received from the second sensor.

At 608, the example process 600 may include calculating the position and/or the orientation of the sensor relative to the marker based at least in part on the estimation of the position and/or the orientation of the sensor relative to the surface and the marker sensor signals. In some examples, this may include calculating the position and/or the orientation of the sensor relative to the marker based at least in part on the surface sensor signals representative of the surface on which the marker is disposed. For example, the surface sensor signals and the marker sensor signals may include sensor signals representative of respective images of the surface and the marker, and the sensor processor may be configured to calculate the position and/or the orientation of the first sensor relative to the marker based at least in part on the sensor signals representative of the images of the surface and the marker. In some examples, receiving the surface sensor signals representative of the surface may include receiving the surface sensor signals from a first sensor coupled to the vehicle, and receiving the marker sensor signals representative of the marker may include receiving the marker signals from a second sensor coupled to the vehicle. In such examples, calculating the position and/or the orientation of the sensor may include calculating the position and/or the orientation of the first sensor and/or the second sensor relative to the marker.

In some examples, the process 600 at step 608 may include identifying an edge and/or a corner of the marker based at least in part on the marker sensor signals. In such examples, the process 600 may include associating the edge and/or the corner of the marker with the estimate of the position and/or the orientation relative to the surface on which the marker is disposed, and calculating the position and/or the orientation of the first sensor and/or the second sensor relative to the marker based at least in part on the association of the edge and/or the corner of the marker and the surface. For example, step 608 may include generating a virtual surface plane based at least in part on the surface sensor signals, and generating a virtual marker based at least in part on the marker sensor signals. Step 608 may further include projecting the virtual marker onto the virtual surface plane, such that the edge and/or the corner of the marker lies in the virtual surface plane, and calculating the position and/or the orientation of the first sensor and/or the second sensor relative to the marker based at least in part on the projection of the virtual marker onto the virtual surface plane.

In some examples, at least some portions of the process 600 may be repeated, for example, by returning to 602 after 608.

At 610, the example process 600 may include calculating a position and/or an orientation of the vehicle relative to the marker based at least in part on the estimation of the position and/or the orientation of the sensor relative to the marker. For example, the position and/or orientation of the sensor relative to the vehicle may be determined or known (e.g., via calibration), and thus, the position and/or the orientation of the vehicle relative to the marker may be determined based at least in part on the position and/or orientation of the sensor relative to the marker.

At 612, the example process 600 may include controlling the vehicle based at least in part on the calculation of the position and/or the orientation of the vehicle relative to the marker. For example, controlling the vehicle may include providing the calculated vehicle position and/or orientation relative to the marker to a vehicle controller, which may generate control commands for controlling maneuvering of the vehicle. In some examples, the vehicle may be a UAV, and the vehicle controller may generate control commands based on at least a portion of the calculated information and provide the control commands to a propulsion controller and/or flight control surfaces of the UAV to maneuver and navigate the UAV along a flight path to a destination. For example, if the marker is associated with a destination along the flight path, the vehicle controller may be configured to generate control commands to maneuver the UAV to the vicinity of the marker, for example, so that the UAV may position itself above the marker and/or land on (or adjacent) the marker. In some examples, the UAV may be configured to deliver a package on (or adjacent) the marker, for example, via operation of an inventory engagement mechanism controller.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system to estimate at least one of a position or an orientation of a vehicle relative to a location marker, the system comprising:

a first sensor configured to be coupled to the vehicle and to generate surface sensor signals representative of a surface on which the location marker is disposed;

a second sensor configured to be coupled to the vehicle and to generate marker sensor signals representative of the location marker; and     a sensor processor in communication with the first sensor and the second sensor and configured to:

estimate at least one of a position of the first sensor relative to the surface on which the location marker is disposed or an orientation of the first sensor relative to the surface on which the location marker is disposed based at least in part on the surface sensor signals received from the first sensor;

estimate at least one of a position of the second sensor relative to the location marker or an orientation of the second sensor relative to the location marker based at least in part on the marker sensor signals received from the second sensor;

identify at least one of an edge of the location marker or a corner of the location marker based at least in part on the marker sensor signals received from the second sensor;

associate the at least one of the edge of the location marker or the corner of the location marker with the at least one of the position of the first sensor relative to the surface on which the location marker is disposed or the orientation of the first sensor relative to the surface on which the location marker is disposed; and         calculate at least one of the position of the vehicle relative to the location marker or the orientation of the vehicle relative to the location marker based at least in part on (i) the at least one of the position of the first sensor relative to the surface or the orientation of the first sensor relative to the surface, and (ii) the at least one of the position of the second sensor relative to the location marker or the orientation of the second sensor relative to the location marker.

2. The system as recited in claim 1, wherein the system is implemented on an unmanned aerial vehicle (UAV), and the system further comprises:

one or more processors; and memory to store a vehicle controller, the vehicle controller being executable by the one or more processors to control operation of the UAV based at least in part on at least one of the position of the vehicle relative to the location marker or the orientation of the vehicle relative to the location marker.

3. The system as recited in claim 1, wherein the first sensor comprises a first imager and the second sensor comprises a second imager, and the sensor processor comprises an image processor configured to calculate the at least one of the position of the vehicle relative to the location marker or the orientation of the vehicle relative to the location marker based at least in part on the surface sensor signals representative of the surface on which the location marker is disposed.

4. The system as recited in claim 3, wherein the first imager and the second imager form at least a portion of a stereo camera system configured to generate signals representative of three-dimensional space.

5. The system as recited in claim 1, wherein the sensor processor is configured to:

estimate a virtual marker plane in which a virtual marker lies;

compare a virtual surface plane with the virtual marker plane; and when the virtual surface plane and the virtual marker plane are coexistent, discontinue using the at least one of the position of the sensor relative to the surface or the orientation of the sensor relative to the surface to calculate the at least one of the position of the sensor relative to the location marker or the orientation of the sensor relative to the location marker.

6. A method comprising:

receiving surface sensor signals representative of the surface on which a marker is disposed from a sensor;

estimating, based at least in part on the surface sensor signals, at least one of a position of the sensor relative to the surface on which the marker is disposed or an orientation of the sensor relative to the surface on which the marker is disposed;

receiving marker sensor signals representative of at least one of a position of the marker relative to the sensor or an orientation of the marker relative to the sensor;

identifying, based at least in part on the marker sensor signals, at least one of an edge of the marker or a corner of the marker;

associating the at least one of the edge of the marker or the corner of the marker with the at least one of the position of the sensor relative to the surface on which the marker is disposed or the orientation of the sensor relative to the surface on which the marker is disposed;

calculating at least one of the position of the sensor relative to the marker or the orientation of the sensor relative to the marker based at least in part on the at least one of the edge of the marker or the corner of the marker and the at least one of the position of the sensor relative to the surface or the orientation of the sensor relative to the surface; and calculating at least one of the position of the sensor relative to the marker or the orientation of the sensor relative to the marker based at least in part on the at least one of the position of the sensor relative to the surface or the orientation of the sensor relative to the surface and the marker sensor signals representative of at least one of the position of the marker relative to the sensor or the orientation of the marker relative to the sensor.

7. The method as recited in claim 6, wherein the sensor comprises one of a first sensor or a second sensor, and wherein receiving the surface sensor signals representative of the surface comprises receiving the surface sensor signals from the first sensor, receiving the marker sensor signals representative of the marker comprises receiving the marker sensor signals from the second sensor, and calculating at least one of the position of the sensor relative to the marker or the orientation of the sensor relative to the marker comprises calculating at least one of the position or the orientation of at least one of the first sensor relative to the surface or the second sensor relative to the marker.

8. The method as recited in claim 7, wherein the surface sensor signals and the marker sensor signals comprise sensor signals representative of respective images of the surface and images of the marker, and calculating the at least one of the position of the sensor relative to the marker or the orientation of the sensor relative to the marker is based at least in part on the sensor signals representative of the images of the surface and the sensor signals representative of the images of the marker.

9. The method as recited in claim 7, wherein the first sensor comprises a first imager, and receiving the surface sensor signals comprises receiving first images from the first imager.

10. The method as recited in claim 9, wherein the second sensor comprises a second imager, and receiving the marker sensor signals comprises receiving second images from the second imager.

11. The method as recited in claim 7, further comprising:

generating a virtual surface plane based at least in part on the surface sensor signals;

generating a virtual marker based at least in part on the marker sensor signals;

projecting the virtual marker onto the virtual surface plane such that at least one of the edge of the marker or the corner of the marker lies in the virtual surface plane; and calculating at least one of the position or the orientation of at least one of the first sensor relative to the marker or the second sensor relative to the marker based at least in part on the projection of the virtual marker onto the virtual surface plane.

12. The method as recited in claim 11, further comprising:

estimating a virtual marker plane in which the virtual marker lies;

comparing the virtual surface plane with the virtual marker plane; and when the virtual surface plane and the virtual marker plane are coexistent, discontinuing using the at least one of the position of the sensor relative to the surface or the orientation of the sensor relative to the surface to calculate the at least one of the position of the sensor relative to the marker or the orientation of the sensor relative to the marker.

13. The method as recited in claim 6, wherein the sensor is coupled to a vehicle and the method further comprises:

calculating at least one of a position of the vehicle relative to the marker or an orientation of the vehicle relative to the marker based at least in part on the at least one of the position of the sensor relative to the marker or the orientation of the sensor relative to the marker; and controlling the vehicle based at least in part on the at least one of the position of the vehicle relative to the marker or the orientation of the vehicle relative to the marker.

14. The method as recited in claim 13, wherein controlling the vehicle comprises landing the vehicle on the marker.

15. A vehicle comprising:

a frame;

a propulsion system;

at least one sensor coupled to the frame and configured to generate (i) surface sensor signals representative of a surface on which a marker is disposed, the marker being associated with a destination of the vehicle, and (ii) marker sensor signals representative of the marker; and a sensor processor in communication with the at least one sensor and configured to:

estimate at least one of a position or an orientation of the at least one sensor relative to the surface on which the marker is disposed based at least in part on the surface sensor signals;

estimate at least one of a position or an orientation of the at least one sensor relative to the marker based at least in part on the marker sensor signals;

identify at least one of an edge of the marker or a corner of the marker based at least in part on the marker sensor signals;

associate at least one of the edge of the marker or the corner of the marker with the at least one of the position or the orientation of the at least one sensor relative to the surface on which the marker is disposed; and calculate at least one of the position or the orientation of the vehicle relative to the marker based at least in part on the at least one of the position or the orientation of the at least one sensor relative to the surface and the at least one of the position or the orientation of the at least one sensor relative to the marker.

16. The vehicle as recited in claim 15, wherein the at least one sensor comprises a first imager and a second imager, and the sensor processor comprises an image processor configured to calculate the at least one of the position or the orientation of the vehicle relative to the marker based at least in part on the surface sensor signals representative of the surface on which the marker is disposed.

17. The vehicle as recited in claim 16, wherein the first imager and the second imager form at least a portion of a stereo camera system configured to generate signals representative of three-dimensional space.

18. The vehicle as recited in claim 15, wherein the sensor processor is configured to align a virtual representation of the at least one of the edge of the marker or the corner of the marker with a virtual surface representative of the surface on which the marker is disposed.

19. The vehicle as recited in claim 18, wherein the sensor processor is configured to discontinue aligning the virtual representation with the virtual surface as the vehicle approaches the marker.

20. The vehicle as recited in claim 19, wherein the sensor processor is configured to:

generate a virtual surface plane based at least in part on the surface sensor signals;

generate a virtual marker based at least in part on the marker sensor signals, the virtual marker comprising at least one of the edge of the marker or the corner of the marker;

project the virtual marker onto the virtual surface plane such that at least one of the edge of the marker or the corner of the marker lies in the virtual surface plane; and calculate at least one of the position or the orientation of the vehicle relative to the marker based at least in part on the projection of the virtual marker onto the virtual surface plane.

* * * * *